(12) United States Patent
Nakane et al.

(10) Patent No.: US 9,126,859 B2
(45) Date of Patent: Sep. 8, 2015

(54) LI$_2$O—AL$_2$O$_3$—SIO$_2$—BASED CRYSTALLIZED GLASS

(75) Inventors: Shingo Nakane, Shiga (JP); Kosuke Kawamoto, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 13/816,005

(22) PCT Filed: Aug. 3, 2011

(86) PCT No.: PCT/JP2011/067753
§ 371 (c)(1),
(2), (4) Date: Feb. 8, 2013

(87) PCT Pub. No.: WO2012/020678
PCT Pub. Date: Feb. 16, 2012

(65) Prior Publication Data
US 2013/0130887 A1 May 23, 2013

(30) Foreign Application Priority Data

Aug. 11, 2010 (JP) ................................. 2010-180443
Apr. 26, 2011 (JP) ................................. 2011-097770

(51) Int. Cl.
| | | |
|---|---|---|
| C03C 10/12 | (2006.01) | |
| C03C 10/14 | (2006.01) | |
| C03C 10/00 | (2006.01) | |
| C03C 3/097 | (2006.01) | |
| C03B 32/02 | (2006.01) | |

(52) U.S. Cl.
CPC ............ *C03C 10/0054* (2013.01); *C03C 3/097* (2013.01); *C03C 10/0027* (2013.01); *C03B 32/02* (2013.01)

(58) Field of Classification Search
CPC .. C03C 10/0009; C03C 10/0027; C03B 32/02
USPC ....................................................... 501/4, 7
See application file for complete search history.

(56) References Cited

U.S. PATENT DOCUMENTS

| | | | |
|---|---|---|---|
| 4,093,468 A | 6/1978 | Boitel et al. | |
| 7,141,521 B2 * | 11/2006 | Siebers et al. | 501/32 |
| 8,053,381 B2 | 11/2011 | Siebers et al. | |
| 8,309,480 B2 | 11/2012 | Fujisawa et al. | |
| 8,507,392 B2 * | 8/2013 | Yamauchi et al. | 501/4 |
| 8,722,554 B2 * | 5/2014 | Comte | 501/68 |
| 8,753,991 B2 * | 6/2014 | Comte et al. | 501/4 |
| 2002/0011481 A1 | 1/2002 | Melson et al. | |
| 2002/0023463 A1 | 2/2002 | Siebers et al. | |
| 2003/0218001 A1 | 11/2003 | Siebers et al. | |
| 2005/0143247 A1 | 6/2005 | Siebers et al. | |
| 2007/0259767 A1 | 11/2007 | Siebers et al. | |
| 2009/0286667 A1 * | 11/2009 | Siebers et al. | 501/59 |
| 2009/0314034 A1 | 12/2009 | Goulas et al. | |
| 2010/0130342 A1 * | 5/2010 | Siebers et al. | 501/7 |
| 2010/0167903 A1 | 7/2010 | Comte et al. | |
| 2011/0071011 A1 * | 3/2011 | Fujisawa et al. | 501/69 |
| 2011/0160033 A1 * | 6/2011 | Yamauchi et al. | 501/69 |
| 2012/0035041 A1 * | 2/2012 | Comte | 501/32 |
| 2013/0178353 A1 | 7/2013 | Comte et al. | |

FOREIGN PATENT DOCUMENTS

| | | | |
|---|---|---|---|
| JP | 39-21049 | | 9/1964 |
| JP | 40-20182 | | 9/1965 |
| JP | 1-308845 | | 12/1989 |
| JP | 11-228180 | | 8/1999 |
| JP | 11-228181 | | 8/1999 |
| JP | 2001-316132 | | 11/2001 |
| JP | 2001-354429 | | 12/2001 |
| JP | 2001-354446 | | 12/2001 |
| JP | 2002154840 | * | 5/2002 |
| JP | 2004-523446 | | 8/2004 |
| JP | 2006-1828 | | 1/2006 |
| JP | 2007-197310 | | 8/2007 |
| JP | 2007-254277 | | 10/2007 |
| JP | 2008-30978 | | 2/2008 |
| JP | 2010-1206 | | 1/2010 |
| JP | 2010-64900 | | 3/2010 |
| JP | 2010-508235 | | 3/2010 |
| WO | 2011/089220 | | 7/2011 |

OTHER PUBLICATIONS

International search report issued Jan. 31, 2012 in International (PCT) Application No. PCT/JP2011/075502.*
International Preliminary Report on Patentability issued Jun. 12, 2013 and English translation of Written Opinion of the International Searching Authority issued Jan. 31, 2012 in International Application No. PCT/JP2011/0175502.*
International Search Report issued Nov. 8, 2011 in International (PCT) Application No. PCT/JP2011/067753.
International Preliminary Report on Patentability and Written Opinion issued Mar. 12, 2013 in International (PCT) Application No. PCT/JP2011/067753.
Final Office Action issued Jan. 29, 2015 in copending U.S. Appl. No. 13/883,857.
Extended European Search Report issued May 6, 2015 in corresponding European Application No. 11816344.3.

* cited by examiner

*Primary Examiner* — Karl Group
(74) *Attorney, Agent, or Firm* — Wenderoth, Lind & Ponack, L.L.P.

(57) ABSTRACT

Provided is a $Li_2O$—$Al_2O_3$—$SiO_2$-based crystallized glass, comprising, as a composition in terms of mass %, 55 to 75% of $SiO_2$, 20.5 to 27% of $Al_2O_3$, 2% or more of $Li_2O$, 1.5 to 3% of $TiO_2$, 3.8 to 5% of $TiO_2+ZrO_2$, and 0.1 to 0.5% of $SnO_2$, and satisfying the relationships of $3.7 \leq Li_2O+0.741MgO+0.367ZnO \leq 4.5$ and $SrO+1.847CaO \leq 0.5$.

16 Claims, No Drawings

LI$_2$O—AL$_2$O$_3$—SIO$_2$—BASED CRYSTALLIZED GLASS

TECHNICAL FIELD

The present invention relates to an Li$_2$O—Al$_2$O$_3$—SiO$_2$-based crystallized glass, and more specifically, to an Li$_2$O—Al$_2$O$_3$—SiO$_2$-based crystallized glass suitable for heat resistant applications such as a front window for a kerosene stove, a wood stove, and the like.

BACKGROUND ART

An Li$_2$O—Al$_2$O$_3$—SiO$_2$-based crystallized glass has been conventionally used as a material for a front window for a kerosene stove, a wood stove, or the like, a substrate for a high-tech product such as a substrate for a color filter or an image sensor, a setter for baking an electronic part, a tray for a microwave oven, a top plate for induction heating cooking, a window glass for a fire prevention door, or the like. For example, Patent Literatures 1 to 3 each disclose an Li$_2$O—Al$_2$O$_3$—SiO$_2$-based crystallized glass comprising an Li$_2$O—Al$_2$O$_3$—SiO$_2$-based crystal, such as a β-quartz solid solution (Li$_2$O·Al$_2$O$_3$·nSiO$_2$ (provided that 4>n≥2)) or a β-spodumene solid solution (Li$_2$O·Al$_2$O$_3$·nSiO$_2$ (provided that n≥4)), precipitated therein as a main crystal.

The Li$_2$O—Al$_2$O$_3$—SiO$_2$-based crystallized glass has a low thermal expansion coefficient and a high mechanical strength, and hence has an excellent thermal property. Further, appropriate adjustment of conditions of heat treatment in a crystallization step allows the kind of crystal precipitated in the Li$_2$O—Al$_2$O$_3$—SiO$_2$-based crystallized glass to be controlled, and hence a transparent crystallized glass (a β-quartz solid solution precipitates) can be easily manufactured.

When the crystallized glass of this kind is produced, a glass batch needs to be melted at high temperature exceeding 1400° C. Thus, used as a fining agent added in the glass batch is As$_2$O$_3$ or Sb$_2$O$_3$, which is capable of generating a fining gas in a large amount during the melting at high temperature. However, As$_2$O$_3$ and Sb$_2$O$_3$ are highly toxic and may pollute an environment, for example, in a production process of the glass or at the time of treating waste glass.

Thus, SnO$_2$ and Cl have been proposed as substitute fining agents for As$_2$O$_3$ and Sb$_2$O$_3$ (see, for example, Patent Literatures 4 and 5). However, Cl is liable to erode a metal mold or a metal roll during glass formation, with the result that the surface quality of the glass maybe degraded. From the viewpoint of preventing such the problem, SnO$_2$ is preferably used as a fining agent.

As described in Patent Literatures 4 and 5, SnO$_2$ has a function of heightening coloring caused by Fe$_2$O$_3$, TiO$_2$, or the like, and hence involves a problem in that a yellow tone of a transparent crystallized glass prevails, which is not preferred in terms of the outer appearance thereof. Thus, when SnO$_2$ is used, it is preferred that the content of Fe$_2$O$_3$ contaminated as an impurity component be reduced and that the content of TiO$_2$ in a glass batch be also reduced. However, TiO$_2$ is a component of a crystal nucleus, and hence, when the content of TiO$_2$ is reduced, an optimum firing temperature range becomes narrower, with the result that the generation amount of crystal nuclei is liable to be smaller. When crystallization progresses in the presence of a small amount of crystal nuclei, a large amount of coarse crystals are generated, causing a problem in that the crystallized glass is liable to become cloudy, thereby losing transparency.

As another method of suppressing the coloring of a transparent crystallized glass, there is known a method involving adding a colorant having a relationship of a complementary color with the coloring caused by Fe$_2$O$_3$, TiO$_2$, or the like, thereby fading the coloring. It has been conventionally known that Nd$_2$O$_3$ is particularly effective for fading colors of the Li$_2$O—Al$_2$O$_3$—SiO$_2$-based crystallized glass (see, for example, Patent Literature 6). Thus, even when the yellow color tone of the Li$_2$O—Al$_2$O$_3$—SiO$_2$-based crystallized glass becomes prevailed by the addition of SnO$_2$, such the yellow color can be faded by adding Nd$_2$O$_3$.

Note that it is possible to obtain a white opaque crystallized glass in which a β-spodumene solid solution is precipitated, by carrying out crystallization under a proper heat treatment condition in a production process of the Li$_2$O—Al$_2$O$_3$—SiO$_2$-based crystallized glass.

CITATION LIST

Patent Literature 1: JP 39-21049 B
Patent Literature 2: JP 40-20182 B
Patent Literature 3: JP 01-308845 A
Patent Literature 4: JP 11-228180 A
Patent Literature 5: JP 11-228181 A
Patent Literature 6: U.S. Pat. No. 4,093,468 B

SUMMARY OF INVENTION

Technical Problem

The color fading of a transparent crystallized glass caused by Nd$_2$O$_3$ is, so to speak, a technique involving converting yellow coloring to an achromatic color by superimposing blue coloring caused by Nd$_2$O$_3$ over the yellow coloring, which involves such a problem in that: the transmittance in a visible region deteriorates so that the outer appearance of the transparent crystallized glass looks dark, and hence the transparency thereof is liable to be impaired.

In addition, there has also been a problem in that a white crystallized glass in which a β-spodumene solid solution is precipitated is liable to have a higher thermal expansion coefficient and a higher dielectric loss. In particular, if the crystallized glass has a higher dielectric loss, when the crystallized glass is used for applications in which electromagnetic waves are used, such as a tray for a microwave oven, the temperature thereof locally rises, causing the breakage thereof.

Therefore, an object of the present invention is to provide a Li$_2$O—Al$_2$O$_3$—SiO$_2$-based crystallized glass, in which SnO$_2$ is used as a substitute fining agent for As$_2$O$_3$ and Sb$_2$O$_3$, having a reduced yellow coloring caused by Fe$_2$O$_3$, TiO$_2$, or the like and an excellent transparency.

Another object of the present invention is to provide a white Li$_2$—O—Al$_2$O$_3$—SiO$_2$-based crystallized glass in which a low thermal expansion property and a low dielectric loss property can be achieved.

Solution to Problem

The inventors of the present invention have made studies into a mechanism through which the coloring caused by components such as TiO$_2$ and Fe$_2$O$_3$ is prevailed by SnO$_2$. As a result, the inventors have found that the above-mentioned problems can be solved by limiting the ratio of each component in a crystallized glass to a particular range, and the finding is proposed as the present invention.

That is, the present invention provides a Li$_2$O—Al$_2$O—SiO$_2$-based crystallized glass, comprising, as a composition in terms of mass %, 55 to 75% of SiO$_2$, 20.5 to 27% of Al$_2$O$_3$, 2% or more of $Li_2O$, 1.5 to 3% of $TiO_2$, 3.8 to 5% of $TiO_2+ZrO_2$, and 0.1 to 0.5% of $SnO_2$, and satisfying the relationships of $3.7 \leq Li_2O+0.741MgO+0.367ZnO \leq 4.5$ and $SrO+1.847CaO \leq 0.5$.

The inventors of the present invention have found that, as the content of $Al_2O_3$ in a glass phase remaining in a crystallized glass increases, the degree of the coloring thereof can be reduced. For such occasions, it is effective to increase the content of $Al_2O_3$ in the composition of glass before crystallization. In particular, the inventors have found that, when the content of $Al_2O_3$ is set as large as 20.5% or more, the degree of the coloring caused by components such as $TiO_2$ and $Fe_2O_3$ and prevailed by $SnO_2$ can be reduced. However, when the content of $Al_2O_3$ in the composition of glass before crystallization exceeds a given content, the excessive $Al_2O_3$ are mostly distributed into a crystal phase during the crystallization, and hence the content of $Al_2O_3$ in the remaining glass phase is difficult to increase. Thus, it would be insufficient for the reduction of the coloring to merely increase the content of $Al_2O_3$ in the composition of glass before crystallization.

Then, various studies have been made into other components. As a result, the inventors have found that, when the value of $Li_2O+0.741MgO+0.367ZnO$ is set as small as 4.5 or less, the content of $Al_2O_3$ in the remaining glass phase in the crystallized glass is likely to increase, thus being able to reduce the degree of the coloring. This can be explained as follows. $Li_2O$, MgO, and ZnO tend to precipitate in the crystal phase together with $Al_2O_3$. When the content of these components are decreased, the amount of $Al_2O_3$ distributed in the crystal phase can be reduced and a larger amount of $Al_2O_3$ can be distributed in the glass phase. Note that the coefficients of MgO and ZnO are added for calculating the content of each component in terms of $Li_2O$ mole.

The inventors have additionally found that SrO and CaO are also involved in the coloring as other influential factors. When the value of $SrO+1.847CaO$ is set as small as 0.5 or less in addition to the above-mentioned limitation of the composition, a crystallized glass having a smaller degree of coloring can be provided. Note that the coefficient of CaO is added for calculating the content of CaO in terms of SrO mole.

Further, it is also necessary to control strictly the content of each of $TiO_2$ and $ZrO_2$, which are crystal nucleation agents. As described previously, as the content of $TiO_2$ is larger, the amount of crystal nuclei is likely to increase, and hence the glass hardly becomes cloudy, meanwhile the problem of prevailed coloring occurs. Further, as the content of $ZrO_2$ is larger, the amount of crystal nuclei is likely to increase, and hence the glass hardly becomes cloudy, meanwhile the devitrification becomes prevailed, which leads to some problems in the forming step. Thus, while taking the content of $Al_2O_3$, the value of $Li_2O+0.741MgO+0.367ZnO$, and the like into consideration, the inventors have made studies into the proper ranges of the content of $TiO_2$ and the content of $TiO_2+ZrO_2$. As a result, the inventors have found that, when both the contents are controlled within the above-mentioned ranges, a crystallized glass which has a desired color tone and are less cloudy, thus having high transparency can be obtained.

The $Li_2O$—$Al_2O_3$—$SiO_2$-based crystallized glass of the present invention is preferable to have a transparent outer appearance.

In this description, the $Li_2O$—$Al_2O_3$—$SiO_2$-based crystallized glass having a transparent outer appearance is also referred to as "$Li_2O$—$Al_2O_3$—$SiO_2$-based transparent crystallized glass."

The $Li_2O$—$Al_2O_3$—$SiO_2$-based crystallized glass of the present invention is preferable to comprise a β-quartz solid solution as a main crystal.

The $Li_2O$—$Al_2O_3$—$SiO_2$-based crystallized glass of the present invention is preferable to comprise 0.1% or more of MgO.

A thermal expansion property is given as an important property in addition to the properties regarding outer appearance such as coloring and cloudiness. When the $Li_2O$—$Al_2O_3$—$SiO_2$-based crystallized glass of the present invention is used for thermal resistant applications, a thermal expansion coefficient thereof is preferably as close to zero as possible in order to reduce a breakage risk. The inventors have made various studies also into the relationship between the thermal expansion coefficient and each component, and have found that, when the $Li_2O$—$Al_2O_3$—$SiO_2$-based crystallized glass comprises 0.1% or more of MgO in the composition range described above, the thermal expansion coefficient thereof can be made close to zero.

The $Li_2O$—$Al_2O_3$—$SiO_2$-based crystallized glass of the present invention is preferable to be substantially free of $Nd_2O_3$ and CoO.

Being substantially free of $Nd_2O_3$ and CoO each serving as a colorant, a crystallized glass having excellent transparency can be obtained. Note that the phrase "substantially free of $Nd_2O_3$ and CoO" means that these components are not added intentionally, and specifically denotes that the content of $Nd_2O_3$ is 100 ppm or less and the content of CoO is 20 ppm or less.

The $Li_2O$—$Al_2O_3$—$SiO_2$-based crystallized glass of the present invention is preferable to comprise a restricted content of $Fe_2O_3$ of 30 to 300 ppm.

$Fe_2O_3$ is a coloring component that is liable to be contaminated as an impurity, and when the content of $Fe_2O_3$ is restricted to the above-mentioned range, the degree of the coloring caused by $Fe_2O_3$ can be reduced.

The $Li_2O$—$Al_2O_3$—$SiO_2$-based crystallized glass of the present invention is preferable to have, as a color tone of transmitted light at a thickness of 3 mm, a b* value of 4.5 or less in terms of L*a*b* representation based on a CIE standard.

The $Li_2O$—$Al_2O_3$—$SiO_2$-based crystallized glass of the present invention is preferable to have a transmittance of 82.5% or more at a thickness of 1.1 mm and a wavelength of 400 nm.

The $Li_2O$—$Al_2O_3$—$SiO_2$-based crystallized glass of the present invention is preferable to have a thermal expansion coefficient of $-2.5 \times 10^{-7}/°C$. to $2.5 \times 10^{-7}/°C$. over 30 to 380° C.

The $Li_2O$—$Al_2O_3$—$SiO_2$-based crystallized glass of the present invention is preferable to comprise a β-spodumene solid solution as a main crystal.

The $Li_2O$—$Al_2O_3$—$SiO_2$-based crystallized glass of the present invention preferably has a white outer appearance.

In this description, the $Li_2O$—$Al_2O_3$—$SiO_2$-based crystallized glass having a white outer appearance is also referred to as "$Li_2O$—$Al_2O_3$—$SiO_2$-based white crystallized glass."

The $Li_2O$—$Al_2O_3$—$SiO_2$-based crystallized glass of the present invention preferably satisfies the relationship of $0.6 \leq BaO+2.474Na_2O+1.628K_2 \leq 3.3$.

The $Li_2O$—$Al_2O_3$—$SiO_2$-based crystallized glass of the present invention is preferable to comprises, in terms of mass %, 0.1% or more of each of BaO, $Na_2O$, and $K_2O$.

The $Li_2O$—$Al_2O_3$—$SiO_2$-based crystallized glass of the present invention is preferable to have a thermal expansion coefficient of $15 \times 10^{-7}/°C$. or less over 30 to 750° C.

The $Li_2O$—$Al_2O_3$—$SiO_2$-based crystallized glass of the present invention is preferable to have a dielectric loss of $48 \times 10^{-3}$ or less at a frequency of 2.45 GHz.

The present invention also presents a method of producing the above-mentioned $Li_2O$—$Al_2O_3$—$SiO_2$-based crystallized glasses, comprising the steps of melting a glass under conditions of a highest temperature of less than 1780° C. and a melting efficiency of 1 to 6 m²/(t/day), forming the molten glass into a predetermined shape, thereby providing a crystallizable glass, and applying heat treatment to the crystallizable glass, thereby causing crystallization.

The degree of the coloring of the crystallized glass is also influenced by the melting conditions of glass in addition to the composition of the glass. Particularly when $SnO_2$ is added, the coloring tends to prevail as the molten glass verges on reduction. This is probably because $Sn^{2+}$ has a larger degree of influence on the coloring than $Sn^{4+}$. In order to prevent the molten glass from verging on reduction to the maximum extent, it is preferred that the melting temperature be lowered and the melting time be shortened. In order to determine the melting time, the melting efficiency (melting area/flow rate) of glass can be adopted as an index of the melting time. Thus, by restricting the melting temperature and the melting efficiency within the above-mentioned ranges, the molten glass is inhibited from verging on reduction, thereby being able to provide the crystallized glass in which the degree of coloring is reduced.

DESCRIPTION OF EMBODIMENTS

A $Li_2O$—$Al_2O_3$—$SiO_2$-based crystallized glass according to the present invention comprises, as a composition in terms of mass %, 55 to 75% of $SiO_2$, 20.5 to 27% of $Al_2O_3$, 2% or more of $Li_2O$, 1.5 to 3% of $TiO_2$, 3.8 to 5% of $TiO_2+ZrO_2$, and 0.1 to 0.5% of $SnO_2$, and satisfies the relationships of $3.7 \leq Li_2O+0.741MgO+0.367ZnO \leq 4.5$ and $SrO+1.847CaO \leq 0.5$.

Hereinafter, the reasons why the content of each component in the $Li_2O$—$Al_2O_3$—$SiO_2$-based transparent crystallized glass is specified as above are described below. Note that in the description of the content range of the each component, "%" refers to "mass %," unless otherwise specified.

$SiO_2$ is a component that forms the network of glass and constitutes a $Li_2O$—$Al_2O_3$—$SiO_2$-based crystal. The content of $SiO_2$ is 55 to 75%, preferably 58 to 70%, particularly preferably 60 to 68%. When the content of $SiO_2$ is less than 55%, the thermal expansion coefficient tends to increase, with the result that it becomes hard to obtain a crystallized glass excellent in thermal shock resistance, and moreover, the chemical durability thereof tends to deteriorate. On the other hand, when the content of $SiO_2$ is more than 75%, the meltability of the glass deteriorates, the viscosity of the molten glass becomes larger, and hence the glass tends to be hard to be fined or formed.

$Al_2O_3$ is a component that forms the network of glass and constitutes a $Li_2O$—$Al_2O_3$—$SiO_2$-based crystal. Further, as described previously, when $Al_2O_3$ is present in a glass phase remaining in a crystallized glass, the degree of the coloring caused by $TiO_2$ and $Fe_2O_3$ and prevailed by $SnO_2$ can be reduced. The content of $Al_2O_3$ is 20.5 to 27%, preferably 21 to 25%, particularly preferably 21.5 to 23%. When the content of $Al_2O_3$ is less than 20.5%, the thermal expansion coefficient tends to increase, with the result that it becomes hard to obtain a crystallized glass excellent in thermal shock resistance, and moreover, the chemical durability tends to deteriorate. In addition, it becomes hard to obtain the effect of reducing the degree of the coloring caused by $TiO_2$ and $Fe_2O_3$ and prevailed by $SnO_2$. On the other hand, when the content of $Al_2O_3$ is more than 27% in glass, the meltability of the glass deteriorates, the viscosity of the molten glass becomes larger, and hence the glass tends to be hard to be fined or formed. In addition, mullite crystals are liable to precipitate to devitrify the glass and the glass is liable to break.

$Li_2O$ is a component that constitutes a $Li_2O$—$Al_2O_3$—$SiO_2$-based crystal, therefore gives a significant influence on the crystallinity, and that lowers the viscosity of glass, thereby improving the meltability and formability of the glass. The content of $Li_2O$ is 2% or more, preferably 2.5% or more. When the content of $Li_2O$ is less than 2%, mullite crystals are liable precipitate to devitrify the glass. Moreover, when the glass is crystallized, $Li_2O$—$Al_2O_3$—$SiO_2$-based crystals becomes hard to precipitate, and hence it is hard to obtain a crystallized glass excellent in thermal shock resistance. In addition, the meltability of the glass deteriorates, the viscosity of the molten glass becomes larger, and hence the glass tends to be hard to be fined or formed. On the other hand, when the content of $Li_2O$ is too large, the crystallinity of the glass becomes too strong, with the result that the glass tends to devitrify and the glass is liable to break. Thus, the content of $Li_2O$ is preferably 4.5% or less, particularly preferably 4% or less.

$TiO_2$ is a component that serves as a crystal nucleation agent for causing crystals to precipitate in a crystallization step. The content of $TiO_2$ is 1.5 to 3%, preferably 1.6 to 2.5%, particularly preferably 1.7 to 2.30. When the content of $TiO_2$ is more than 3% in glass, the coloring of the glass tends to prevail, and also the glass tends to devitrify, causing to be liable to break. On the other hand, when the content of $TiO_2$ is less than 1.5%, crystal nuclei is not formed sufficiently, with the result that coarse crystals precipitate, leading to clouding or breakage of the resultant crystallized glass.

In the $Li_2O$—$Al_2O_3$—$SiO_2$-based crystallized glass of the present invention, the value of $Li_2O+0.741MgO+0.367ZnO$ falls within the range of 3.7 to 4.5, preferably 3.8 to 4.4, particularly preferably 3.8 to 4.2. When the value of $Li_2O+0.741MgO+0.367ZnO$ is more than 4.5, the content of $Al_2O_3$ in the glass phase in the crystallized glass decreases, and hence it becomes hard to obtain the effect of $Al_2O_3$ on suppressing coloring. On the other hand, when the value of $Li_2O+0.741MgO+0.367ZnO$ is less than 3.7, the grain diameter of a $Li_2$—$Al_2O_3$—$SiO_2$-based crystal in the crystallized glass becomes larger, and the crystallized glass is liable to be cloudy, with the result that the transparency of the crystallized glass may be impaired.

Note that the content of each of the MgO and ZnO components is not particularly limited as long as the above-mentioned range is satisfied, but the content is preferably restricted, for example, to the following range.

MgO is a component that dissolves in a $Li_2O$—$Al_2O_3$—$SiO_2$-based crystal and has the effect of increasing the thermal expansion coefficient of the $Li_2O$—$Al_2O_3$—$SiO_2$-based crystal. The content of MgO is preferably 0 to 2%, 0.1 to 1.5%, 0.1 to 1.3%, particularly preferably 0.1 to 1.2%. When the content of MgO is more than 2% in glass, the crystallinity may become too strong, with the result that the glass tends to devitrify and the glass is liable to break.

ZnO is a component that dissolves in a $Li_2O$—$Al_2O_3$—$SiO_2$-based crystal as MgO is. The content of ZnO is preferably 0 to 2%, 0 to 1.5%, particularly preferably 0.1 to 1.2%. When the content of ZnO is more than 2% in glass, the crystallinity thereof may become too strong, and hence, when the glass is formed while being cooled mildly, the glass tends to devitrify. As a result, the glass is liable to break, and hence it is difficult to form the glass, for example, by a float method.

In the $Li_2O$—$Al_2O_3$—$SiO_2$-based crystallized glass of the present invention, the value of $SrO+1.847CaO$ falls within the range of 0.5 or less, preferably 0.4 or less, particularly preferably 0.2 or less. When the value of SrO+1.847CaO is more than 0.5, the degree of the coloring of the crystallized glass increases and the crystallized glass is also liable to be cloudy.

Note that the content of each of the SrO and CaO components is not particularly limited as long as the above-mentioned range is satisfied. For example, the content of SrO is limited to preferably 0.5% or less, particularly preferably 0.3% or less, and the content of CaO is limited to preferably 0.2% or less, particularly preferably 0.1% or less.

$SnO_2$ is a component that serves as a fining agent. The content of $SnO_2$ is 0.1 to 0.5%, preferably 0.1 to 0.4%, particularly preferably 0.1 to 0.3%. When the content of $SnO_2$ is less than 0.1%, it becomes hard to obtain the effect of $SnO_2$ as a fining agent. On the other hand, when the content of $SnO_2$ is more than 0.5%, the coloring caused by $TiO_2$ and $Fe_2O_3$ becomes prevailed excessively, and hence the crystallized glass is liable to be yellow-tinged. In addition, the glass is liable to devitrify.

The crystallized glass is preferable to be substantially free of $Nd_2O_3$ and CoO serving as colorants, because $Nd_2O_3$ and CoO reduce the transparency of the crystallized glass. In particular, CoO has a very strong coloring ability, and even a trace amount thereof causes a significant change in the color tone of the crystallized glass. Thus, it is preferred that the $Li_2O$—$Al_2O_3$—$SiO_2$-based crystallized glass of the present invention be substantially free of $Nd_2O_3$ and CoO serving as colorants. With this, it becomes possible to obtain a $Li_2O$—$Al_2O_3$—$SiO_2$-based transparent crystallized glass having high transparency and a determinate color tone. Further, $Nd_2O_3$ is one of the rare earths, which leads to increase material cost. Avoiding the use of $Nd_2O_3$ substantially, an inexpensive $Li_2O$—$Al_2O_3$—$SiO_2$-based crystallized glass can be obtained. Note that, when priority is put on less coloring rather than higher transparency, $Nd_2O_3$ may be added at, for example, about 500 ppm.

As for $Fe_2O_3$ contaminated as an impurity component, the content thereof should also be limited. The content of $Fe_2O_3$ is preferably 300 ppm or less, 250 ppm or less, particularly preferably 200 ppm or less. The content of $Fe_2O_3$ is preferably as small as possible because the degree of coloring lowers. However, in order to control the content of $Fe_2O_3$ within the range of, for example, less than 60 ppm, it is necessary to use a high purity material or the like, with the result that it becomes hard to provide an inexpensive $Li_2O$—$Al_2O_3$—$SiO_2$-based crystallized glass.

In the $Li_2O$—$Al_2O_3$—$SiO_2$-based transparent crystallized glass of the present invention, the following various components may be added in addition to the above-mentioned components.

$ZrO_2$ is a crystal nucleation component for causing crystals to precipitate in the crystallization step as $TiO_2$ is. The content of $ZrO_2$ is preferably 0 to 3%, 0.1 to 2.5%, particularly preferably 0.5 to 2.3%. When the content of $ZrO_2$ is more than 3% in glass, the glass tends to devitrify during melting, and hence the glass becomes hard to be formed.

Note that, in the present invention, the content of $TiO_2$+$ZrO_2$ is limited to 3.8 to 5%, preferably 4 to 4.5%. When the content of $TiO_2$+$ZrO_2$ falls within the above range, it is possible to obtain a crystallized glass which has a desirable color tone, is less cloudy, and have high transparency.

$B_2O_3$ is a component that promotes the dissolution of a $SiO_2$ material in a glass melting step. The content of $B_2O_3$ is preferably 0 to 2%. When the content of $B_2O_3$ is more than 2%, the thermal resistance of the glass tends to be impaired.

$P_2O_5$ is a component that promotes the phase separation of glass and assists the formation of a crystal nucleus. The content of $P_2O_5$ is preferably 0 to 3%, 0.1 to 3%, particularly preferably 1 to 2%. When the content of $P_2O_5$ is more than 3%, the glass is liable to cause phase separation during a melting step, with the result that it becomes hard to obtain the glass having a desired composition and also the glass tends to be opaque.

Further, it is possible to add $Na_2O$, $K_2O$, and BaO at a total content of preferably 0 to 2%, particularly preferably 0.1 to 2%, in order to reduce the viscosity of the molten glass and improve the meltability and formability thereof. When the total content of these components is more than 2%, the glass is liable to devitrify.

Note that raw glass materials for the above-mentioned components are as given below. Examples of raw glass materials for $Li_2O$, $Al_2O_3$, and $SiO_2$, which are main components, include lithium carbonate, silica sand, silica stone, aluminum oxide, and aluminum hydroxide. Further, spodumene can be given as an inexpensive $Li_2O$ raw material, but spodumene generally includes a high proportion of $Fe_2O_3$ in many cases, and hence the usage of spodumene needs to be restricted. As for the other components, raw materials for $ZrO_2$ often contain $Fe_2O_3$ as an impurity, and hence it is preferred to use zirconium silicate, in which the content of $Fe_2O_3$ is 0.5% or less, or high-purity $ZrO_2$ materials.

The $Li_2O$—$Al_2O_3$—$SiO_2$-based crystallized glass of the present invention has preferably, as a color tone of transmitted light at a thickness of 3 mm, a b* value of 4.5 or less, particularly preferably 4 or less, in terms of L*a*b* representation based on the CIE standard. Further, the $Li_2O$—$Al_2O_3$—$SiO_2$-based crystallized glass of the present invention has preferably a transmittance of 82.5% or more, particularly preferably 83% or more, at a thickness of 1.1 mm and a wavelength of 400 nm The $Li_2O$—$Al_2O_3$—$SiO_2$-based crystallized glass of the present invention, which is used for heat resistant applications, has preferably a thermal expansion coefficient as close to zero as possible. Specifically, the thermal expansion coefficient is preferably $-2.5 \times 10^{-7}/°$ C. to $2.5 \times 10^{-7}/°$ C., particularly preferably $-1.5 \times 10^{-7}/°$ C. to $1.5 \times 10^{-7}/°$ C. over the temperature range of 30 to 380° C. When $Li_2O$—$Al_2O_3$—$SiO_2$-based crystallized glass have a thermal expansion coefficient out of the above-mentioned range, the crystallized glass is more liable to break.

The $Li_2O$—$Al_2O_3$—$SiO_2$-based crystallized glass of the present invention can be manufactured by, for example, a production method comprising the steps of melting a glass batch under the conditions of a highest temperature of less than 1780° C. and a melting efficiency of 1 to 6 $m^2/(t/day)$, forming the molten glass into a predetermined shape, thereby providing a crystallizable glass, and applying heat treatment to the crystallizable glass, thereby causing crystallization.

The highest temperature during melting step is preferably less than 1780° C., 1750° C. or less, particularly preferably 1700° C. or less. When the highest temperature in melting step is 1780° C. or more, a Sn component is liable to be reduced and the degree of coloring tends to be prevailed. The lower limit of the highest temperature during melting step is not particularly limited, but is preferably 1600° C. or more, particularly preferably 1650° C. or more, in order to cause vitrification reaction to progress sufficiently, thereby obtaining homogeneous glass.

The melting efficiency of glass is preferably 1 to 6 $m^2/(t/day)$, particularly preferably 1.5 to 5 $m^2/(t/day)$. When the melting efficiency of glass is less than 1 $m^2/(t/day)$, the melting time is too shortened, which leads to too reduced fining time, and hence it becomes hard to obtain a glass excellent in bubble-less quality. On the other hand, when the melting efficiency of glass is more than 6 m$^2$/(t/day), a Sn component is liable to be reduced and the degree of coloring tends to be prevailed.

A crystallizable glass can be obtained by forming molten glass into a predetermined shape. For such occasions, various forming methods such as a float method, a press method, and a rollout method can be employed depending on the intended shape of the crystallizable glass.

The crystallized glass can be manufactured from the crystallizable glass as described above, in the following manner. Note that, in the present invention, it is also possible to produce both a transparent crystallized glass and a white crystallized glass each having desired properties from one kind of crystallizable glass, by appropriately changing the heat treatment temperature (in particular, the heat treatment temperature at the stage of crystal growth). In this case, steps such as a material preparation step, a melting step, and a forming step, before a crystallization step can be unified, and hence the production cost can be suppressed.

The formed Li$_2$O—Al$_2$O$_3$—SiO$_2$-based crystallizable glass is subjected to heat treatment at 600 to 800° C. for 1 to 5 hours to form crystal nuclei (a crystal nucleation stage), followed by additional heat treatment at 800 to 950° C. for 0.5 to 3 hours, thereby causing Li$_2$O—Al$_2$O$_3$—SiO$_2$-based crystals to precipitate as main crystals (a crystal growth stage). Thus, the Li$_2$O—Al$_2$O$_3$—SiO$_2$-based transparent crystallized glass can be produced.

Note that, when heat treatment is carried out at a high temperature of 1000° C. or more, in particular, 1100° C. or more in the crystal growth stage, it is possible to obtain the white Li$_2$O—Al$_2$O$_3$—SiO$_2$-based crystallized glass in which crystals of a β-spodumene solid solution are precipitated as main crystals. However, when the heat treatment temperature in the crystal growth stage is too high, the growth rate of a crystal becomes fast, and hence coarse crystals are liable to be generated. Thus, the upper limit of the heat treatment temperature is preferably 1150° C. or less, particularly preferably 1145° C. or less. Note that the time period of the heat treatment in the crystal growth stage is appropriately selected, for example, from 0.1 to 3 hours, so that crystals sufficiently grow and also generation of coarse crystals is prevented.

Further, as the precipitated crystals are larger, the dielectric loss becomes higher. Thus, when the crystallized glass is used for applications in which electromagnetic waves are used, such as a tray for a microwave oven, the temperature thereof locally rises, causing the breakage thereof. In order to reduce the diameter of crystal grains, it is preferred to set heat treatment conditions so that many nuclei are formed in the crystal nucleation stage. Specifically, the heat treatment in the crystal nucleation stage is preferably carried out at 700 to 820° C. When the heat treatment is carried out at a temperature lower than the range, crystal nuclei become hard to be generated. When the heat treatment is carried out at a temperature higher than the range, crystal growth might set in. A time period for crystal nucleation is not particularly limited as long as sufficient amounts of crystal nuclei are generated, and is appropriately selected, for example, from 1 to 5 hours.

The Li$_2$O—Al$_2$O$_3$—SiO$_2$-based white crystallized glass preferably has the same composition as that of the Li$_2$O—Al$_2$O$_3$—SiO$_2$-based transparent crystallized glass described previously, unless otherwise specified.

As the content of alkali or alkaline-earth component is larger in the Li$_2$O—Al$_2$O$_3$—SiO$_2$-based white crystallized glass, the thermal expansion coefficient and dielectric loss thereof are liable to increase. This is probably because alkali or alkaline-earth component generally increase non-bridging oxygen in glass, and hence, when these components are added, molecular vibration by thermal energy is enhanced in glass and ions become more mobile in glass. Thus, when the content of alkali or alkaline-earth component is decreased, the thermal expansion coefficient and the dielectric loss can be reduced. Note that, even when the content of alkali or alkaline-earth component is too small, the thermal expansion coefficient and the dielectric loss are liable to increase, although the detailed mechanism thereof is unclear.

Moreover, alkali or alkaline-earth component serves as melting accelerate component, and hence the addition of these components provides the effect of suppressing air bubbles remaining in the glass. Particularly, in the case of avoiding the usage of As$_2$O$_3$ or Sb$_2$O$_3$ as a fining agent, even when SnO$_2$ is added as a substitute fining agent, air bubbles in the glass are liable to increase. Therefore, the effect of the addition of alkali or alkaline-earth component is significant.

In view of the foregoing, in the Li$_2$O—Al$_2$O$_3$—SiO$_2$-based white crystallized glass, it is preferred to adjust the content of alkali or alkaline-earth component, particularly BaO, Na$_2$O, and K$_2$O which are liable to influence the above-mentioned effect. Specifically, the value of BaO+2.474Na$_2$O+1.628K$_2$O is preferably 0.6 to 3.3, particularly preferably 1 to 3.2. Here, the coefficients of Na$_2$O and K$_2$O are added for calculating the content of each component in terms of BaO mole.

Note that it has been found that the mobility of ions in glass can be further reduced by the mixed alkali effect. Thus, when glass comprises each of BaO, Na$_2$O, and K$_2$O components at 0.1% or more, the effect of suppressing the movement of ions in the glass can be obtained, and hence a lower thermal expansion coefficient and a lower dielectric loss can be achieved.

The Li$_2$O—Al$_2$O$_3$—SiO$_2$-based white crystallized glass has a thermal expansion coefficient of preferably 15×10$^{-7}$/° C. or less, particularly preferably 14×10$^{-7}$/° C. or less over the temperature range of 30 to 750° C. When the Li$_2$O—Al$_2$O$_3$—SiO$_2$-based white crystallized glass has a thermal expansion coefficient exceeding the range, the crystallized glass is liable to break, in a heat resistant application. Note that the lower limit of the thermal expansion coefficient is not particularly limited, but is realistically 5×10$^{-7}$/° C. or more, particularly realistically 10×10$^{-7}$/° C. or more.

The Li$_2$O—Al$_2$O$_3$—SiO$_2$-based white crystallized glass has a dielectric loss of preferably 48×10$^{-3}$ or less, particularly preferably 47×10$^{-3}$ or less, at a frequency of 2.45 GHz. When the Li$_2$O—Al$_2$O$_3$—SiO$_2$-based white crystallized glass has a dielectric loss exceeding the range, the crystallized glass is liable to break due to a local temperature rise thereof, in an application using an electromagnetic wave, such as a tray for a microwave oven. Note that the lower limit of the dielectric loss is not particularly limited, but is realistically 20×10$^{-3}$ or more, particularly realistically 30×10$^{-3}$ or more, at a frequency of 2.45 GHz.

The Li$_2$O—Al$_2$O$_3$—SiO$_2$-based crystallized glass of the present invention may be subjected to post-processing such as cutting, polishing, or bending processing or to painting or the like on the surface.

EXAMPLES

Hereinafter, the present invention is described in detail by way of examples. However, the present invention is not limited to the following examples.

Examples 1 to 7 and Comparative Examples 1 to 6

First, raw materials in the forms of an oxide, a hydroxide, a carbonate, a nitrate, and the like were blended and uniformly mixed to obtain a glass having each of the compositions shown in Table 1. The resultant raw material batch was loaded into a refractory furnace of oxygen combustion system, and was then melted under the conditions of a melting efficiency of 2.5 m$^2$/(t/day) and a highest temperature of 1680° C. The molten glass was stirred with a platinum stirrer and was then subjected to roll forming so as to have a thickness of 4 mm, followed by cooling to room temperature in an annealing furnace, thereby obtaining a crystallizable glass.

Heat treatment was applied to the crystallizable glass at 760 to 780° C. for 3 hours to conduct crystal nucleation. After that, the resultant was additionally subjected to heat treatment at 870° C. to 890° C. for 1 hour, causing crystallization. The resultant crystallized glass was measured for its color tone, transmittance, and thermal expansion coefficient.

A transparent crystallized glass sheet having a thickness of 3 mm, which had been subjected to optical polishing of both surfaces thereof, was measured for its transmittance at a wavelength of 380 to 780 nm by using a spectrophotometer, and the L*a*b* value based on the CIE standard was calculated from the transmittance. The color tone of transmitted light was evaluated based on the L*a*b* value.

A crystallized glass sheet having a thickness of 1.1 mm, which had been subjected to optical polishing of both surfaces thereof, was measured for its transmittance at a wavelength of 400 nm by using a spectrophotometer. In this manner, the transmittance was evaluated.

A glass sample prepared by processing the crystallized glass into a rod having a size of 50 mm in length by 5 mm in diameter was measured for its average linear thermal expansion coefficient in the temperature range of 30 to 380° C., and the thermal expansion coefficient of the glass was evaluated based on the average linear thermal expansion coefficient.

TABLE 1

|  |  | Example | | | | | | |
|---|---|---|---|---|---|---|---|---|
|  |  | 1 | 2 | 3 | 4 | 5 | 6 | 7 |
| Glass composition (mass %) | $S_iO_2$ | 65.75 | 65.7 | 65.7 | 65.7 | 65.1 | 65.3 | 65.75 |
|  | $Al_2O_3$ | 22.3 | 22.2 | 22.2 | 22.1 | 21.9 | 22.2 | 22.1 |
|  | $Li_2O$ | 3.6 | 3.57 | 3.57 | 3.8 | 2.94 | 3.57 | 4.15 |
|  | $Na_2O$ | 0.35 | 0.35 | 0.35 | 0.35 | 0.35 | 0.35 | 0.5 |
|  | $K_2O$ | 0.3 | 0.3 | 0.3 | 0.3 | 0.3 | 0.3 | 0.3 |
|  | MgO | 0.7 | 0.7 | 0.85 | 0.7 | 0.85 | 0.85 |  |
|  | CaO |  |  |  |  |  |  |  |
|  | SrO |  |  |  |  |  |  |  |
|  | BaO | 1.2 | 1.2 | 1.2 | 1.2 | 1.2 | 1.7 | 1.5 |
|  | ZnO |  |  |  |  | 1.61 |  |  |
|  | $TiO_2$ | 2.0 | 2.0 | 2.0 | 2.0 | 2.0 | 2.0 | 2.0 |
|  | $ZrO_2$ | 2.2 | 2.2 | 2.2 | 2.2 | 2.2 | 2.2 | 2.2 |
|  | $P_2O_5$ | 1.4 | 1.4 | 1.4 | 1.4 | 1.4 | 1.4 | 1.3 |
|  | $SnO_2$ | 0.2 | 0.4 | 0.2 | 0.2 | 0.1 | 0.1 | 0.2 |
|  | $Fe_2O_3$ (ppm) | 200 | 200 | 200 | 200 | 200 | 200 | 200 |
|  | $Li_2O + 0.741MgO + 0.367ZnO$ | 4.1 | 4.1 | 4.2 | 4.3 | 4.2 | 4.2 | 4.2 |
|  | $SrO + 1.847CaO$ | 0.0 | 0.0 | 0.0 | 0.0 | 0.0 | 0.0 | 0.0 |
| b* value |  | 3.3 | 3.9 | 3.4 | 3.4 | 3.4 | 3.5 | 3.4 |
| Transmittance at 400 nm (%) |  | 85 | 83 | 85 | 85 | 85 | 85 | 85 |
| Thermal expansion coefficient ($\times 10^{-7}$/° C.) |  | −0.9 | −0.9 | −0.2 | −1 | 1.3 | 1.1 | −8.4 |

TABLE 2

|  |  | Comparative Example | | | | | |
|---|---|---|---|---|---|---|---|
|  |  | 1 | 2 | 3 | 4 | 5 | 6 |
| Glass composition (mass %) | $S_iO_2$ | 65.2 | 67.8 | 64.5 | 66.3 | 66.3 | 64.1 |
|  | $Al_2O_3$ | 22.1 | 20.2 | 22.1 | 22.3 | 22.3 | 22.2 |
|  | $Li_2O$ | 4.15 | 3.57 | 3.57 | 2.95 | 3.57 | 3.57 |
|  | $Na_2O$ | 0.35 | 0.35 | 0.35 | 0.35 | 0.35 | 0.35 |
|  | $K_2O$ | 0.3 | 0.3 | 0.3 | 0.3 | 0.3 | 0.3 |
|  | MgO | 0.85 | 0.85 | 0.85 | 0.85 | 0.85 | 0.85 |
|  | CaO |  |  |  |  |  | 0.5 |
|  | SrO |  |  |  |  |  | 0.5 |
|  | BaO | 1.2 | 1.2 | 1.2 | 1.2 | 1.2 | 1.7 |
|  | ZnO |  |  |  |  |  |  |
|  | $TiO_2$ | 2.0 | 2.0 | 3.3 | 2.0 | 1.4 | 2.0 |
|  | $ZrO_2$ | 2.2 | 2.2 | 2.2 | 2.2 | 2.2 | 2.2 |
|  | $P_2O_5$ | 1.4 | 1.4 | 1.4 | 1.4 | 1.4 | 1.4 |
|  | $SnO_2$ | 0.2 | 0.1 | 0.2 | 0.1 | 0.1 | 0.3 |
|  | $Fe_2O_3$ (ppm) | 200 | 200 | 200 | 200 | 200 | 200 |
|  | $Li_2O + 0.741MgO + 0.367ZnO$ | 4.8 | 4.2 | 4.2 | 3.6 | 4.2 | 4.2 |
|  | $SrO + 1.847CaO$ | 0.0 | 0.0 | 0.0 | 0.0 | 0.0 | 1.4 |
| b* value |  | 4.7 | 5.2 | 5.4 | 13.8 | 5.3 | 4.7 |
| Transmittance at 400 nm (%) |  | 82.5 | 81 | 80 | 69 | 81 | 82.5 |
| Thermal expansion coefficient ($\times 10^{-7}$/° C.) |  | −1.1 | −1.8 | 0.6 | 4.6 | −1.5 | 2.9 |

As evident from Table 1, it is found that the crystallized glasses of Examples all had a b* value of as small as 3.9 or less and have a transmittance of as high as 83% or more. In contrast, the crystallized glasses of Comparative Examples had a b* value of as large as 4.6 or more. Further, the crystallized glasses of Comparative Examples 2, 4, and 5 had a transmittance of as low as 81% or less.

Example 8

A crystallized glass was manufactured in the same manner as in Example 1, except that the raw material batch was melted at a melting efficiency of 2 m$^2$/(t/day) and a highest temperature of 1820° C. The resultant crystallized glass was measured for its b* value. As a result, it was found that the b* value was larger by about 1 than that of the crystallized glass of Example 1, and hence the coloring of the crystallized glass of Example 8 was prevailed.

Examples 9 to 14 and Comparative Examples 7 to 10

Tables 3 and 4 show Examples 9 to 14 and Comparative Examples 7 to 10.

TABLE 3

|  |  | Example | | | | | |
|---|---|---|---|---|---|---|---|
|  |  | 9 | 10 | 11 | 12 | 13 | 14 |
| Glass | SiO$_2$ | 65.7 | 65.7 | 65.4 | 65.6 | 65.8 | 65.7 |
| composition | Al$_2$O$_3$ | 22.3 | 22.2 | 22.1 | 22.1 | 22.2 | 22.3 |
| (mass %) | Li$_2$O | 3.6 | 4.2 | 3.6 | 3.6 | 3.6 | 3.6 |
|  | Na$_2$O | 0.4 | 0.5 | 0.4 | 0.4 | 0.4 | 0.4 |
|  | K$_2$O | 0.3 | 0.3 | 0.3 | 0.3 | 0.3 | 0.3 |
|  | MgO | 0.7 |  | 0.7 | 0.7 | 0.7 | 0.7 |
|  | ZnO |  |  | 0.5 |  | 0.5 |  |
|  | BaO | 1.2 | 1.5 | 1.2 | 1.2 | 0.7 | 1.2 |
|  | TiO$_2$ | 2.0 | 2.0 | 2.0 | 2.0 | 2.0 | 2.0 |
|  | ZrO$_2$ | 2.2 | 2.2 | 2.2 | 2.2 | 2.2 | 2.2 |
|  | P$_2$O$_5$ | 1.4 | 1.3 | 1.4 | 1.4 | 1.4 | 1.4 |
|  | SnO$_2$ | 0.2 | 0.1 | 0.2 | 0.5 | 0.2 | 0.2 |
|  | Cl |  |  |  |  |  |  |
|  | Li$_2$O + 0.741MgO + 0.367ZnO | 4.1 | 4.2 | 4.3 | 4.1 | 4.3 | 4.1 |
|  | BaO + 2.474Na$_2$O + 1.628K$_2$O | 2.7 | 3.2 | 2.7 | 2.7 | 2.2 | 2.7 |
| Nucleation temperature (° C.) |  | 790 | 790 | 790 | 790 | 790 | 730 |
| Highest temperature (° C.) |  | 1130 | 1145 | 1145 | 1130 | 1130 | 1130 |
| Thermal expansion coefficient (×10$^{-7}$) |  | 14 | 12 | 13 | 14 | 12 | 14 |
| Dielectric loss (×10$^{-3}$) |  | 47 | 43 | 47 | 38 | 45 | 45 |

TABLE 4

|  |  | Comparative Example | | | |
|---|---|---|---|---|---|
|  |  | 7 | 8 | 9 | 10 |
| Glass | SiO$_2$ | 64.8 | 65.3 | 64.9 | 65.1 |
| composition | Al$_2$O$_3$ | 21.8 | 22.2 | 22.2 | 22.1 |
| (mass %) | Li$_2$O | 3.6 | 3.6 | 3.6 | 3.6 |
|  | Na$_2$O | 0.4 | 0.9 |  | 0.4 |
|  | K$_2$O | 0.3 | 0.3 | 0.5 | 0.3 |
|  | MgO | 0.8 | 0.8 | 0.8 | 1.6 |
|  | ZnO |  |  |  |  |
|  | BaO | 2.5 | 1.2 | 2.2 | 1.2 |
|  | TiO$_2$ | 2.0 | 2.0 | 2.0 | 2.0 |
|  | ZrO$_2$ | 2.2 | 2.2 | 2.2 | 2.2 |
|  | P$_2$O$_5$ | 1.4 | 1.4 | 1.4 | 1.4 |
|  | SnO$_2$ | 0.2 | 0.1 | 0.2 | 0.1 |
|  | Cl |  |  |  |  |
|  | Li$_2$O + 0.741 MgO + 0.367 ZnO | 4.2 | 4.2 | 4.2 | 4.8 |
|  | BaO + 2.474 Na$_2$O + 1.628 K$_2$O | 4.0 | 3.9 | 3.0 | 2.7 |
| Nucleation temperature (° C.) |  | 790 | 790 | 790 | 790 |
| Highest temperature (° C.) |  | 1130 | 1130 | 1130 | 1130 |
| Thermal expansion coefficient (×10$^{-7}$) |  | 16 | 17 | 15 | 17 |
| Dielectric loss (×10$^{-3}$) |  | 52 | 49 | 57 | 35 |

Each sample was manufactured as follows. First, raw materials in the forms of an oxide, a hydroxide, a carbonate, a nitrate, and the like were blended and uniformly mixed to obtain a glass having each of the compositions shown in the tables, thereby preparing a raw material batch. The raw material batch was loaded into a platinum crucible, was melted at 1600° C. for 18 hours in an electric furnace, and was then melted additionally at 1650° C. for 2 hours. Subsequently, the molten glass, which was poured from the platinum crucible, was subjected to roll forming so as to have a thickness of 5 mm, followed by cooling to room temperature in an annealing furnace, thereby obtaining a Li$_2$O—Al$_2$O$_3$—SiO$_2$-based crystallizable glass.

The resultant Li$_2$O—Al$_2$O$_3$—SiO$_2$-based crystallizable glass was heated at 790° C. for 100 minutes to perform crystal nucleation. After that, the resultant was heated at 1130° C. for 30 minutes, causing crystal growth, thereby obtaining an Li$_2$O—Al$_2$O$_3$—SiO$_2$-based white crystallized glass.

The resultant Li$_2$O—Al$_2$O$_3$—SiO$_2$-based white crystallized glass was evaluated for its thermal expansion coefficient and dielectric loss.

The Li$_2$O—Al$_2$O$_3$—SiO$_2$-based white crystallized glass was processed into a rod having a size of 50 mm in length by 5 mm in diameter, the rod was measured for its average linear thermal expansion coefficient in the temperature range of 30 to 750° C. by using a dilatometer, and the thermal expansion coefficient of the white crystallized glass was evaluated based on the average linear thermal expansion coefficient.

The dielectric loss was determined by using a cavity resonator (at a measurement frequency of 2.45 GHz at 25° C.)

As evident from Tables 3 and 4, it was found that the Li$_2$O—Al$_2$O$_3$—SiO$_2$-based white crystallized glasses of Examples 9 to 14 had a thermal expansion coefficient of as low as 14×10$^{-7}$ or less and a dielectric loss of as low as 47×10$^{-3}$ or less.

On the other hand, the Li$_2$O—Al$_2$O$_3$—SiO$_2$-based white crystallized glasses of Comparative Examples 7, 8, and 10 had a thermal expansion coefficient of as large as $16\times10^{-7}$ or more. Further, the $Li_2O$—$Al_2O_3$—$SiO_2$-based white crystallized glasses of Comparative Examples 7 to 9 had a dielectric loss of as large as $49\times10^{-3}$ or more.

Industrial Applicability

The $Li_2O$—$Al_2O_3$—$SiO_2$-based crystallized glass of the present invention is suitable for a front window for a kerosene stove, a wood stove, or the like, a substrate for a high-tech product such as a substrate for a color filter or an image sensor, a setter for baking an electronic part, a tray for a microwave oven, a top plate for induction heating cooking, a window glass for a fire prevention door, or the like.

The invention claimed is:

1. A $Li_2O$—$Al_2O_3$—$SiO_2$-based crystallized glass, comprising, as a composition in terms of mass %, 55 to 75% of $SiO_2$, 20.5 to 27% of $Al_2O_3$, 2 to 4% of $Li_2O$, 1.5 to 3% of $TiO_2$, 3.8 to 5% of $TiO_2+ZrO_2$, 0 to 2% of $Na_2O+K_2O+BaO$, and 0.1 to 0.5% of $SnO_2$, and satisfying the relationships of $3.7\leq Li_2O+0.741MgO+0.367ZnO\leq 4.5$ and $SrO+1.847CaO\leq 0.5$,
wherein the $Li_2O$—$Al_2O_3$—$SiO_3$-based crystallized glass comprises a β-quartz solid solution as a main crystal.

2. The $Li_2O$—$Al_2O_3$—$SiO_2$-based crystallized glass according to claim 1, wherein the $Li_2O$—$Al_2O_3$—$SiO_2$-based crystallized glass has a transparent outer appearance.

3. The $Li_2O$—$Al_2O_3$—$SiO_2$-based crystallized glass according to claim 1, wherein the $Li_2O$—$Al_2O_3$—$SiO_2$-based crystallized glass comprises 0.1% or more of MgO.

4. The $Li_2O$—$Al_2O_3$—$SiO_2$-based crystallized glass according to claim 1, wherein the $Li_2O$—$Al_2O_3$—$SiO_2$-based crystallized glass is substantially free of $Nd_2O_3$ and CoO.

5. The $Li_2O$—$Al_2O_3$—$SiO_2$-based crystallized glass according to claim 1, wherein the $Li_2O$—$Al_2O_3$—$SiO_2$-based crystallized glass further comprises 30 to 300 ppm of $Fe_2O_3$.

6. The $Li_2O$—$Al_2O_3$—$SiO_2$-based crystallized glass according to claim 1, wherein the $Li_2O$—$Al_2O_3$—$SiO_2$-based crystallized glass has, as a color tone of transmitted light at a thickness of 3 mm, a b* value of 4.5 or less in terms of L*a*b* representation based on the CIE standard.

7. The $Li_2O$—$Al_2O_3$—$SiO_2$-based crystallized glass according to claim 1, wherein the $Li_2O$—$Al_2O_3$—$SiO_2$-based crystallized glass has a transmittance of 82.5% or more at a thickness of 1.1 mm and a wavelength of 400 nm.

8. The $Li_2O$—$Al_2O_3$—$SiO_2$-based crystallized glass according to claim 1, wherein the $Li_2O$—$Al_2O_3$—$SiO_2$-based crystallized glass has a thermal expansion coefficient of $-2.5\times10^{-7}$/° C. to $2.5\times10^{-7}$/° C. over 30 to 380° C.

9. A $Li_2O$—$Al_2O_3$—$SiO_2$-based crystallized glass, comprising, as a composition in terms of mass %, 55 to 75% of $SiO_2$, 20.5 to 27% of $Al_2O_3$, 2 to 4% of $Li_2O$, 1.5 to 3% of $TiO_2$, 3.8 to 5% of $TiO_2+ZrO_2$, 0 to 2% of $Na_2O+K_2BaO$, and 0.1 to 0.5% of $SnO_2$, and satisfying the relationships of $3.7\leq Li_2O+0.741MgO+0.367ZnO\leq 4.5$ and $SrO+1.847CaO\leq 0.5$,
wherein the $Li_2O$—$Al_2O_3$—$SiO_2$-based crystallized glass comprises a β-spodumene solid solution as a main crystal.

10. The $Li_2O$—$Al_2O_3$—$SiO_2$-based crystallized glass according to claim 9, wherein the $Li_2O$—$Al_2O_3$—$SiO_2$-based crystallized glass has a white outer appearance.

11. The $Li_2O$—$Al_2O_3$—$SiO_2$-based crystallized glass according to claim 9, which satisfies the relationship of $0.6\leq BaO+2.474Na_2O+1.628K_2O\leq 3.3$.

12. The $Li_2O$—$Al_2O_3$—$SiO_2$-based crystallized glass according to claim 9, wherein the $Li_2O$—$Al_2O_3$—$SiO_2$-based crystallized glass comprises, in terms of mass %, 0.1% or more of each of BaO, $Na_2O$, and $K_2O$.

13. The $Li_2O$—$Al_2O_3$—$SiO_2$-based crystallized glass according to claim 9, wherein the $Li_2O$—$Al_2O_3$—$SiO_2$-based crystallized glass has a thermal expansion coefficient of $15\times10^{-7}$/° C. or less over 30 to 750° C.

14. The $Li_2O$—$Al_2O_3$—$SiO_2$-based crystallized glass according to claim 9, wherein the $Li_2O$—$Al_2O_3$—$SiO_2$-based crystallized glass has a dielectric loss of $48\times10^{-3}$ or less at a frequency of 2.45 GHz.

15. A method of producing the $Li_2O$—$Al_2O_3$—$SiO_2$-based crystallized glass according to claim 1, comprising the steps of:
melting a glass under conditions of a highest temperature of less than 1780° C. and a melting efficiency of 1 to 6 $m^2$/(t/day);
forming the molten glass into a predetermined shape, thereby providing a crystallizable glass; and
applying heat treatment to the crystallizable glass, thereby causing crystallization.

16. The $Li_2O$—$Al_2O_3$—$SiO_2$-based crystallized glass according to claim 1, wherein the $Li_2O$—$Al_2O_3$—$SiO_2$-based crystallized glass is substantially free of $As_2O_3$ and $Sb_2O_3$.

* * * * *